Nov. 14, 1939. W. H. SILVER Re. 21,266

LISTER

Original Filed Jan. 7, 1935 4 Sheets-Sheet 1

INVENTOR
Walter H. Silver
BY E. B. Boff and C. R. Parker
ATTORNEYS.

Nov. 14, 1939. W. H. SILVER Re. 21,266

LISTER

Original Filed Jan. 7, 1935 4 Sheets-Sheet 2

INVENTOR
Walter H. Silver
BY
E. C. Bopp and C. T. Parker
ATTORNEYS.

LISTER

Original Filed Jan. 7, 1935 4 Sheets-Sheet 3

INVENTOR
Walter H. Silver
BY S. A. Boff and C. T. Parker
ATTORNEYS.

Nov. 14, 1939. W. H. SILVER Re. 21,266
LISTER
Original Filed Jan. 7, 1935 4 Sheets-Sheet 4
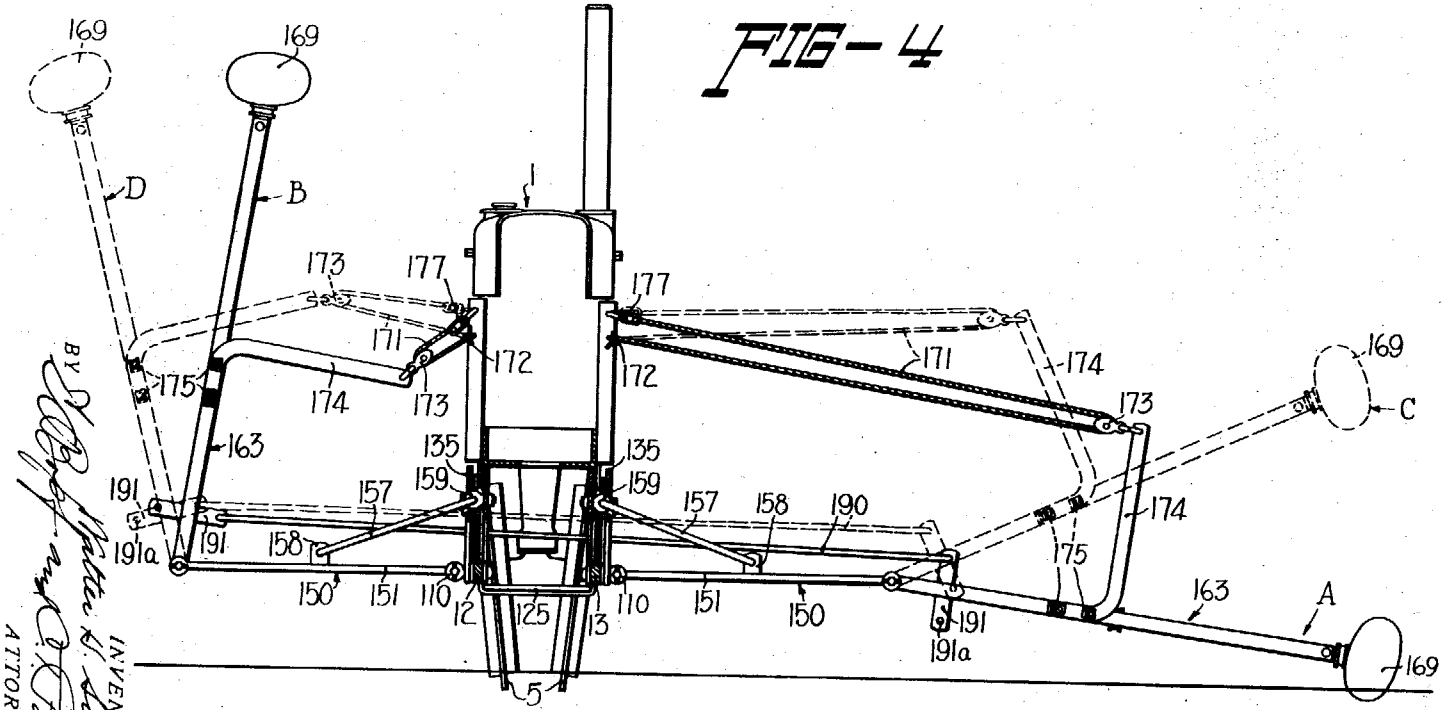
INVENTOR
Walter H. Silver
BY E. A. Boff and C. T. Parker
ATTORNEYS.

Reissued Nov. 14, 1939

Re. 21,266

UNITED STATES PATENT OFFICE 21,266

LISTER

Walter H. Silver, Moline, Ill., assignor to Deere & Company, Moline, Ill., a corporation of Illinois Original No. 2,144,347, dated January 17, 1939, Serial No. 583, January 7, 1935. Renewed June 6, 1938. Application for reissue July 3, 1939, Serial No. 282,741

35 Claims. (Cl. 111—59)

The present invention relates generally to agricultural implements and is more particularly concerned with listers and other furrow opening implements, either with or without seeding mechanisms.

The principal object of the present invention is the provision of a new and improved lister which can readily be set up either as a two row, three row or four row machine, as desired or as determined by operating conditions. For example, the machine may be used as a two row implement for heavy listing, as a three row machine when operating conditions are more favorable, and as a four row machine when the power requirements are relatively small, as when planting on the tops of the ridges in which case only the tops are worked by the ground working tools.

Another object of the present invention, particularly in connection with the provision of a machine having the aforesaid characteristics, is the provision of planting mechanisms which are readily detachable and, moreover, are also readily adjustable with the tools, whether the machine is to be used as a two row, three row or a four row implement.

An additional object of the present invention is the provision of new and improved hitch means by which the draft is transmitted to the ground working tools, and a still further object of the present invention is the provision of improved means for supporting the markers, which are desirable when seeding means is utilized in the listing operation.

A still further object of the present invention is the provision of improved means for preventing lateral displacement of the implement relative to the tractor by which it is supported, and an additional object of the present invention is the provision of improved gauging means for determining the operating depth of the tools, which gauging means is also so constructed and arranged as to efficiently and effectively accommodate the adjustments of the tools necessary to change the implement to a two row, three row or a four row machine.

These and other objects of the present invention will be apparent to those skilled in the art after a consideration of the following detailed description of one preferred construction, taken in conjunction with the accompanying drawings illustrating such construction.

In the drawings:

Figure 4 is a view taken along the line 4—4 of Figure 3, with the portion of the tractor shown in full lines.

Figure 1:
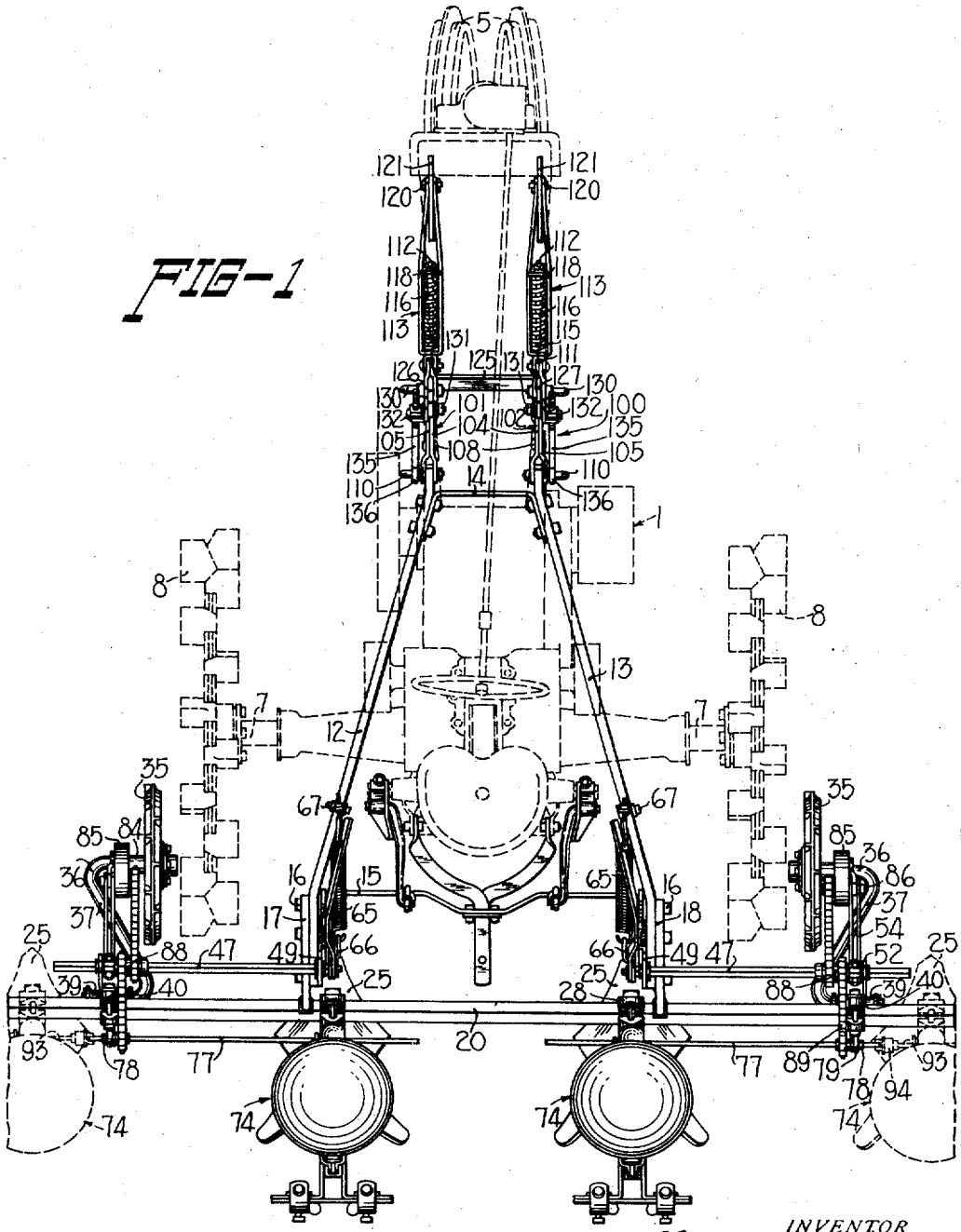
Figure 1 is a top plan view of an implement employing the principles of the present invention, with the tractor with which the implement is adapted to be detachably connected shown in dotted lines.
Figure 2:
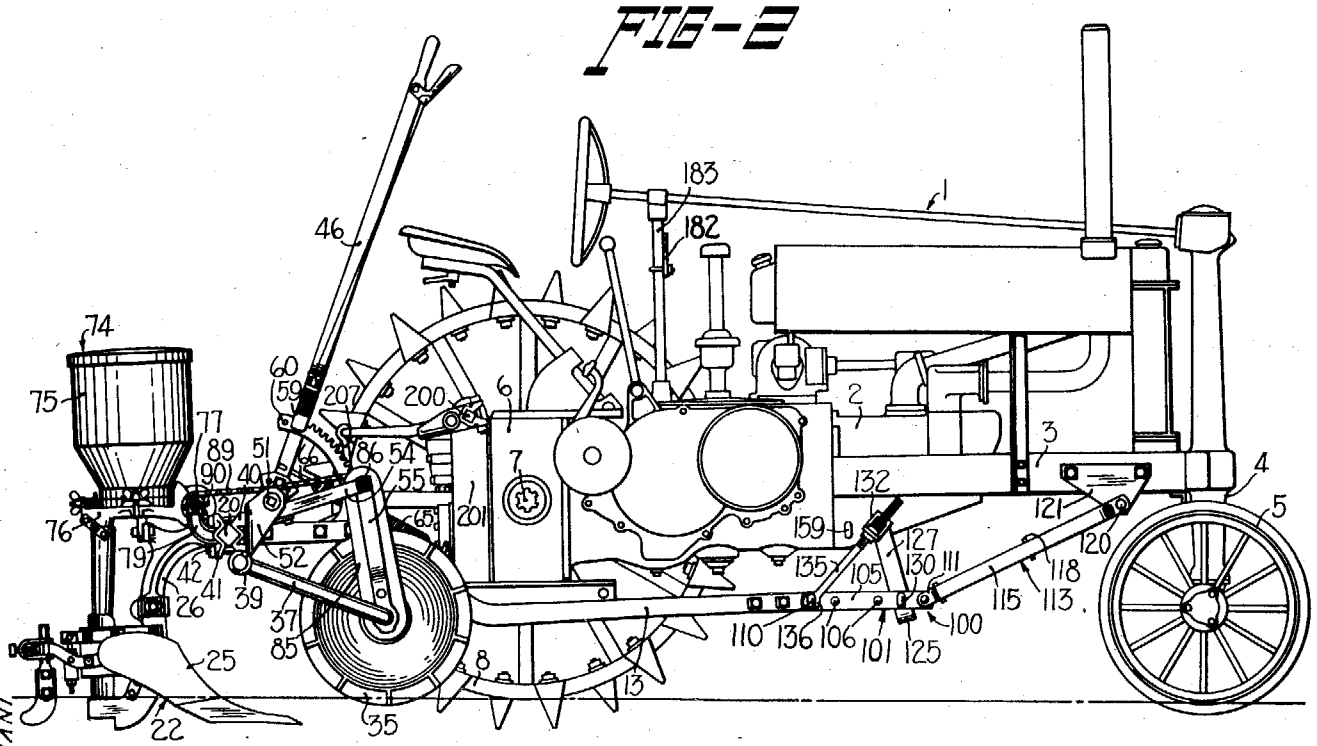
Figure 2 is a side view of the machine shown in Figure 1, with the tractor shown in full lines.

Referring now to the drawings, particularly Figures 1 and 2, the reference numeral 1 indicates a tractor of the type extensively used on farms at the present time and including a motor 2 supported on or serving as a part of a framework 3, the forward end of which is carried on a front truck 4, preferably but not necessarily equipped with closely spaced front steering wheels 5. The rear of the tractor includes an axle housing 6 in which is journaled live axle shafts 7 to the outer ends of which traction wheels 8 are connected. The motor drives the axle shafts 7 through suitable transmission means in a manner well understood by those skilled in the art.

The lister comprises a pair of longitudinally extending beams 12 and 13 which are connected together adjacent their forward ends by a brace member 14 secured thereto by bolts or the like. The rear ends of the beams are connected together by another brace member 15, which serves as a part of the lifting mechanism as will be described later, and at their rear ends the beams 12 and 13 are rigidly secured, as by bolts 16 or the like, to a pair of forwardly extending arms 17 and 18 which are fixed to a transverse tool bar 20 that extends transversely of the tractor, preferably laterally outwardly of the rear traction wheels 8. The transverse tool bar 20, as best shown in Figure 2, is of polygonal cross section, in the preferred construction being a square shaft or bar. A number of tools may be clamped onto the transverse tool bar 20, and according to the principles of the present invention suitable gauging means and seeding mechanisms are also adapted to be mounted or carried by the transverse bar 20. As mentioned above, two, three or four tools 22 may be supported in a number of laterally adjusted positions along the transverse bar 20, and each of the tools 22 in the illustrated construction embodies a furrow opener 25 carried at the lower end of a downwardly and rearwardly curved standard 26, the upper end of which is formed with a forwardly facing V-shaped socket 27, best shown in Figures 1 and 3, and this portion of the upper end of the standard carries a correspondingly V-shaped cap 28 secured to the standard by bolts 29. By virtue of the polygonal cross section of the tool bar 20 and the form of the socket 27 and the clamping part 28, when the bolts 29 are tightened the standard 26 is rigidly secured to the tool bar 20 against displacement, laterally or otherwise. The latter member is of uniform cross section throughout its length so that any desired spacing between the ground working tools may be secured by merely loosening the bolts 29 and shifting the tool standards 26 along the bar 20 to the desired position. Also, by applying or removing one or more of the tools, the machine may be changed to a two row, three row or four row machine. In Figure 1, for example, in full lines there are illustrated two tools, which illustrates how the machine appears when arranged for two-row operation. If, for example, it is desired to operate on four rows, two additional tools are applied to the tool bar 20, preferably laterally outwardly of the traction wheels 8 in the manner and position indicated in dotted lines in Figure 1.

The depth at which the various tools, whether two, three or four, are operated is governed by means of a pair of gauge wheels 35 journaled on the crank portions 36 of crank axles 37, the latter having axle portions 38 disposed in parallel relation with respect to the crank portions 36 and supported in bearings 39 formed integral with clamping brackets 40, the latter having sockets which, together with caps 41 and bolts 42, serve as clamping means for adjustably connecting the gauge wheels 35 with the transverse tool bar 20. By reason of this manner of supporting the gauge wheels they, too, may be adjusted in any desired lateral position. Preferably, however, the gauge wheels 35 are disposed so as to operate fairly close to the rear traction wheels 8. Not only may the gauge wheels 35 be disposed in various lateral positions by sliding the clamping means along the tool bar 20, but the two gauge wheel assemblies may be transposed from one side of the tractor to the other to obtain still other positions for the gauge wheels.

The vertical position of each gauge wheel 35 with respect to the lister bottoms 25 is controlled by means of a lever 46 which is fixed to the inner end of a rock shaft 47, the latter being rockably mounted in a laterally inner bearing 48 carried by bracket 49 bolted or otherwise secured to the inner end of the associated beam 12 or 13 and in a bearing 51 carried by a bracket 52 suitably fixed to the clamping bracket 40 in which the axle end 38 of the crank axle 37 at that side of the tractor is journaled. Preferably, the bolts 42 which fasten the socket cap 41 against the bracket 40 in clamping the gauge wheel in place are also utilized for mounting the bracket 52.

Figure 3:
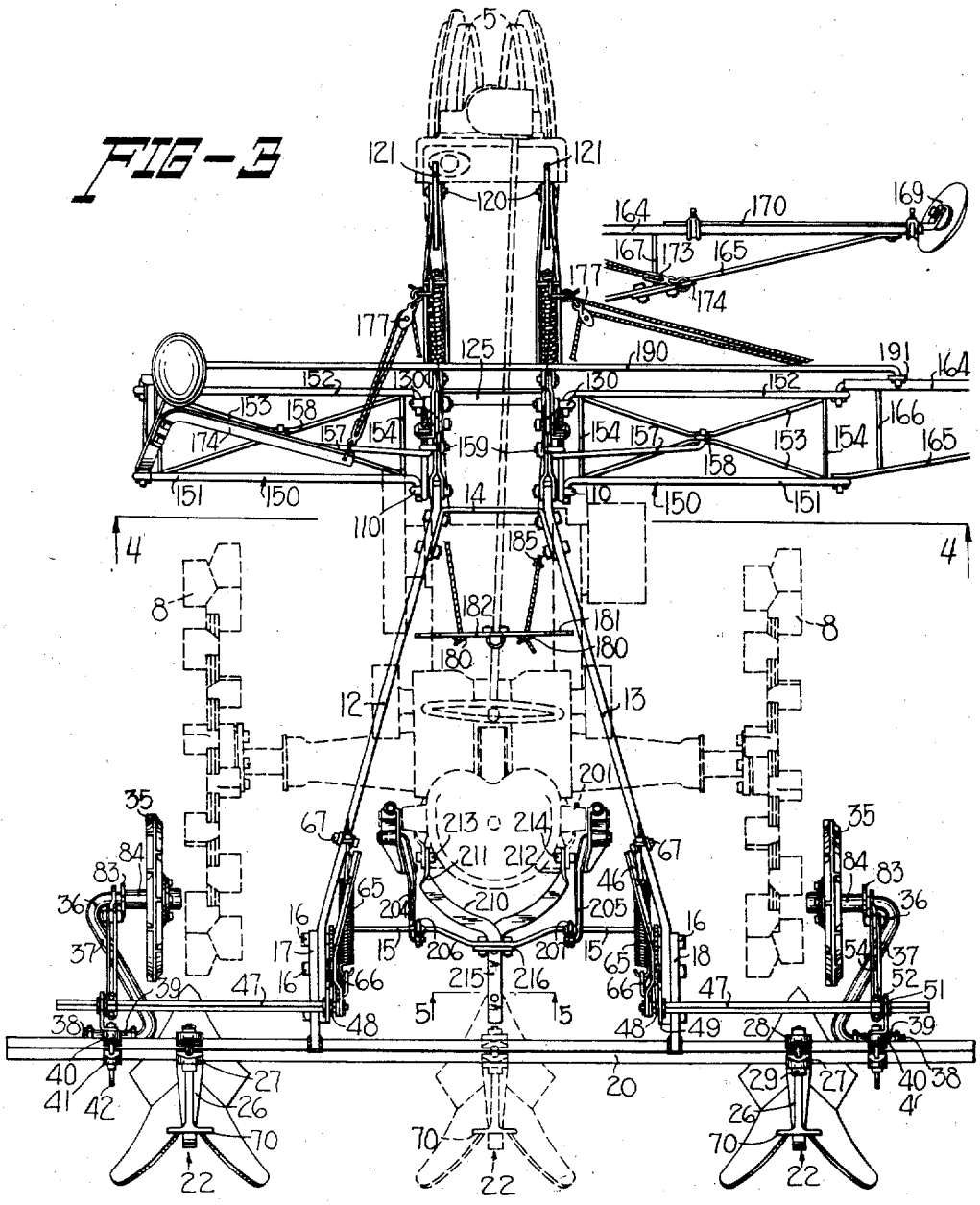
Figure 3 is a top plan view similar to Figure 1 but, in addition, illustrating the position and relation of marker means adapted to be used when the machine is equipped with seeding mechanism.

An arm 54 is adjustably fixed to each rock shaft, and the outer ends of the arms 54 are connected by means of a link 55 to the crank portion of the associated crank axle 37, as best shown in Figure 2. The adjusting levers 46 are provided with the usual latch mechanism 59 for cooperation with sectors 60 bolted to the inner sides of the longitudinal beams 12 and 13, and by the operation of swinging either or both of the adjusting levers 46, the tool bar 20 may be raised and lowered by thus swinging the crank axles 37. There is provided one adjusting lever 46 at each side of the tractor, together with associated parts, so that each gauge wheel 35 may be adjusted independently of one another, or they may be adjusted together by swinging the levers 46 together. Adjusting one gauge wheel independently of the other serves to level the implement. To aid the operator in changing the depth at which the bottoms 25 operate, each of the adjusting mechanisms is provided with or includes a tension spring 65, there thus being one spring for each gauge wheel assembly. The rear end of each of the springs 65 is connected to a link 66 which, in turn, is connected to the lower portion of the associated adjusting lever 46, and the forward ends of the springs 65 are adjustably connected, respectively, to brackets 67 fixed to the beams 12 and 13, as best shown in Figures 1 and 3.

As mentioned above, the lateral positions of any of the tools can be adjusted merely by loosening the clamp 27, 28 and sliding the tools to the desired position, and the gauge wheels may be adjusted in a similar manner, as by loosening the clamp 40 and sliding the gauge wheels to the position desired. In this latter operation it is necessary to loosen the arm 54 from the rock shaft so that the arm, which is a part of the gauge wheel assembly, can slide relative to the associated rock shaft 47, the laterally inner end of which is held against displacement in the bearing 48. In other words, the gauge wheel assembly has adjustable sliding connection with not only the tool bar 20 but also the rock shaft 47, which serves to determine the position of the gauge wheel relative to the tools 22.

Each of the soil working tools 22 is provided with means for directly receiving seeding mechanism, and to this end the supporting standard 26 of each furrow opener 25 is provided with a bracket section 70 (Figure 3) to which the seeding or planting mechanism may be securely fastened. Preferably, although not necessarily, the bracket sections 70 are formed integral with the standards 26. The seeding mechanism is of more or less conventional construction, there being a separate unit for each tool. Each unit, indicated in its entirety by the reference numeral 74, consists of a seed container 75 mounted upon a suitable base 76 in which is disposed seed selecting mechanism operated by power derived from the adjacent gauge wheel 35, the one or more units at each side of the tractor being driven from the gauge wheel at that side. The operating connections include a seed selecting drive shaft 77 supported at its inner end in a bearing forming a part of the seed selecting mechanism and preferably carried by the base 76. The outer end of each of the seed selecting shafts 77 is journaled in a bearing 78 carried in a bracket 79 formed integral with the cap 41, which is a part of the clamp 40 by which the gauge wheel assembly is secured to the transverse tool bar 20. The shaft 77 at the other side of the tractor is supported in the same way, and each of these shafts is slidably disposed in the bearing carried by the seeding unit base 76 at the inner end of the shaft 77. When the position of the furrow openers on the tool bar 20 is adjusted, the shaft 77 merely slides through the bearing carried by the base 76 supporting the inner end of the shaft, referring particularly to the two planting units shown in full lines in Figure 1. The bearings 78 and associated parts serve to hold the shaft 77 at each side of the machine against sliding in the bearing relative to the clamping bracket 40.

Each of the seed selecting drive shafts 7 is driven from the gauge wheel 35 at that side of the tractor, as mentioned above. The power is transmitted by means of a sprocket 83 fixed to the hub 84 of the gauge wheel and connected by means of a sprocket chain, enclosed within the casing 85, to a sprocket journaled on a pin 86 which, when the planting attachment is used, also forms the means for pivotally connecting the arm 54 to the link 55. The sprocket just mentioned is a double sprocket and includes a section connected by means of a sprocket chain 87 to a second double sprocket 88, one section of which is connected by means of a sprocket chain 89 with a sprocket 90 (Figure 2) carried or suitably fixed to the seed selecting drive shaft 77 adjacent the bracket 79. Since the arm 54 swings vertically about the axis defined by the rock shaft 47, the vertical movements of the gauge wheel will have no effect upon the transmission of power to the seeding mechanism, for the driving sprocket chain 87 as a whole also swings about the same axis transmitting power from the gauge wheel 35 to the sprocket 90 carried by the seed selecting drive shaft 77. As best shown in Figure 1, when four planting mechanisms are used, the laterally outer seed selecting mechanisms are driven by shafts 93 coupled with shafts 77 by means of couplings 94, and the laterally outer ends of these shafts 93 are slidable in the associated planting units.

The forward ends of the generally longitudinally extending beams 12 and 13 are connected to a hitch device which is indicated in Figures 1 and 2 by the reference numeral 100. The hitch device comprises a pair of laterally spaced generally fore and aft extending links 101 and 102, each link consisting of a pair of straps 104 and 105 suitably secured together in permanent fashion, as by rivets 106 or the equivalent. At their rear ends these straps are spread to receive the front ends of the beams 12 and 13 therebetween, the beams being pivotally connected thereto by means of eye bolts 110. The forward end of each of the links 101 and 102 is pivotally connected by means of a bolt or pin to the bifurcated head 111 of a bolt 112 forming a part of a resilient draft transmitting spring mechanism 113. Each of the mechanisms 113 includes a U-shaped bracket 115 enclosing a compression spring 116 which embraces the bolt 112 and bears at its forward end against a slide 118 held between the side portions of the U-shaped bracket 115, as best shown in Figure 1. The forward end of each of the brackets 115 is pivotally connected by bolts or pins 120 to a plate 121 bolted or otherwise secured to the side bars 3 of the tractor, as best shown in Figure 2. The hitch mechanism 100 also includes a generally transversely disposed U-shaped member 125, the arms 126 and 127 of which extend upwardly between the straps 104 and 105 of the links 101 and 102, and are pivotally connected thereto by means of eye bolts 130. At their upper ends the arm portions 126 and 127 are pivotally connected to the sides of the tractor 1 by means of bolts 131, and the latter also serve to support angle brackets 132 which are perforated to receive the upper threaded ends of a pair of links 135, the lower ends of which are formed with an eye 136 received upon the eye bolts 110.

As best indicated in Figure 2, the parallel links 101 and 102, the U-shaped member 127 and the links 135, serve as a triangular draft transmitting member disposed generally transversely of the tractor and swingable about an axis defined by the bolts 131, such swinging motion being resisted by the compression springs 116. The threaded ends of the links 135 carry suitable adjusting nuts by which the position of the links 101 and 102, particularly the rear ends thereof to which the forward ends of the beams 12 and 13 are connected, may be adjusted, and it will also be observed that when the compression springs 116 yield, under excessive draft, for example, the hitch points between the beams 12 and 13 and the hitch mechanism 100, will be raised to a certain extent, thereby causing the tools 25 to operate momentarily at less depth.

A pair of markers are provided for the implement, one disposed on each side of the tractor and each marker includes a marker support 150 which comprises a pair of members 151 and 152 connected together by means of diagonal braces 153 and transverse braces 154. At their inner ends the members 151 and 152 are bent rearwardly, as best shown in Figure 3, and are pivotally connected to the eyes of the bolts 110 and 130. Each of the marker supports 150 is held in a laterally extending position by means of a link 157 which is pivotally connected at its outer end to a perforated lug 158 suitably fixed, as by welding or the like, to the center portion of the diagonal members 153, and at their laterally inner or upper ends the links 157 are pivotally connected to the sides of the tractor by means of eye bolts 159.

Each of the marker supports 150 carries a pivoted marker arm indicated in its entirety by the reference numeral 163, and each of the arms 163 include outwardly converging members 164 and 165 reenforced by suitable transverse braces 166 and 167, as best shown in Figure 3. Marking disk 169 is carried on a bar 170 adjustably secured to the outer ends of each of the marker arms, and each arm is raised and lowered by means of a cable 171 which is connected to the side of the tractor, as at 172, and extends through a pulley 173 connected to the upper end of an arm 174 which is suitably fixed, as by bolts 175, to the arm 163 intermediate its ends and extending upwardly therefrom when the arm is in operating position and laterally inwardly therefrom when the arm is in raised position, as best indicated in Figure 4. From the pulley 173, the cable 171 extends through a pulley 177 supported on the tractor and is then brought to the rear of the tractor adjacent the operator's position thereon where a knot 180 is put in the end of the cable by which the latter can be engaged in a fork 181 formed on the end of a bracket 182 carried by the steering post 183 of the tractor. A second knot 185 is also provided in each cable for holding the markers in transport position.

The two marker arms 163 are connected to swing together by means of a transverse link 190 which is connected at its opposite ends to brackets 191 suitably fixed to the forward marker bars 164 in any suitable manner. The transverse link 190 is made of such length that when one of the markers is disposed in an operating position, as shown at A in the right hand portion of Figure 4, the other marker is in a near vertical position and slightly inclined towards the tractor, as shown in the left hand portion of Figure 4 at B. When the operator reaches the end of the field, he will pull the cable 171 of the marker arm which was in operating position rearwardly far enough to place the second knot 185 on the cable in engagement with the fork 181. This will raise the associated marker, which was in operating position, to the position shown at C in Figure 4, and this movement of the marker arm in operating position will cause the opposite marker arm, the one in inoperative position, to be shifted slightly, now being inclined away from the tractor, as shown at D in Figure 4. It is to be noted, however, that the marker in position D is still held up in a position sufficiently near the vertical so as not so project outwardly to any appreciable extent. This makes it possible for the operator to drive very close to fences and other obstructions and turn around at the end of the field without having the raised marker strike the fence or other objects. After the operator has turned around and is ready to start back on the next set of rows, he pulls the cable 171 of the marker which is being raised and releases the cable for the marker being lowered, the latter marker serving now to overbalance the first marker whereupon the first marker is raised and the other marker swings downwardly into operating position.

To hold both markers in fully raised position all that it is necessary to do is to disconnect the link 190 at one end, pull both of the cables 171 rearwardly to raise both markers to a position corresponding to position B in Figure 4, and then reengage the disconnected end of the link 190 in the opening 191*a* in the other end of the bracket 191.

The implement is raised into inoperative position by means of lifting connections with the lifting rock shaft 200 which forms a part of the power lift mechanism indicated in its entirety by the reference numeral 201. These lifting connections include arms 204 and 205 which are connected by vertical links 206 and 207 with the transverse member 15 which, as has been described above, also serves to connect and reenforce the rearmost ends of the longitudinal beams 12 and 13. The lifting connections are substantially the same as the lifting connections shown in my Patent No. 2,130,512, issued September 20, 1938.

Figure 5:
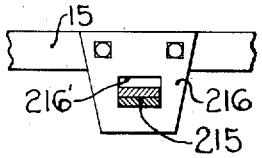
Figure 5 is a view taken along the line 5—5 of Figure 3, but to an enlarged scale.

The lateral swinging of the implement relative to the tractor is limited by means cooperating with the transverse brace 15. This means includes a Y-shaped member 210 having arm sections laterally spaced, as at 211 and 212, and pivoted for vertical swinging movement about a transverse axis on aligned bolts 213 and 214 carried by lugs or any other suitable means on the tractor. The central portion of the Y-shaped member 210, indicated by the reference numeral 215, extends rearwardly and is received by a slotted plate 216 disposed in a transverse vertical plane and which is bolted or riveted to the central portion of the brace member 15, the slot, indicated by numeral 216′ in Figure 5. The slotted plate 216, being bolted or riveted thereto, as aforesaid, forms a part of the brace member and the slot or opening 216′ faces generally longitudinally of the tractor and toward the axis of pivotal swinging of the beams 12 and 13 and toward the transverse axis defined by the pivot bolts 213 and 214, so as to receive the central arm 215, the slot being slightly larger than the central section 215 to accommodate raising and lowering movements of the implement, but the connection of the member 210 at laterally spaced points on the tractor serve to prevent lateral swinging of the implement with respect thereto.

To disconnect the implement from the tractor, it is merely necessary to disconnect the lifting connections 204 and 205 from the bar 15, remove the pins 120, and bolts 131 and 159, disconnect the pulleys 173 from the marker arm brackets 174, and then disconnect the transverse link 190. Thereupon, the tractor may be driven forwardly away from the implement, the rear traction drive wheels passing over the marker supports 150. If it is not desired to drive over these parts, although there is no particular injury done in doing so, the marker supports may be left attached and the implement disconnected by removing the bolts or pins 110, or, if desired, the marker supports may be detached from the hitch mechanism by merely removing the cotter pins at the inner bent ends of the members 151 and 152 and removed out of the path of the tractor wheels.

While I have described above the preferred structure in which the principles of the present invention have been embodied, it is to be understood that my invention is not to be limited to the details shown and described, but that, in fact, widely different means may be employed in the practice of the broader aspects of my invention.

What I claim, therefore, and desire to secure by Letters Patent is:

1. A lister comprising a generally longitudinally extending beam, a transverse tool bar connected to said beam, earth working tool means connected to said bar and capable of adjustment laterally along the tool bar, a gauge wheel secured to said tool bar and also shiftable laterally along said bar, adjusting means mounted on said longitudinally extending beam and fixed against lateral movement relative thereto, and means slidably connecting said gauge wheel with said adjusting means to accommodate movement of the gauge wheel relative thereto when the gauge wheel is shifted laterally along the tool bar.

2. A lister comprising a pair of laterally spaced generally longitudinally extending beams, a transverse tool bar connected to said beams, a plurality of earth working tools independently connected to said bar and capable of individual adjustment laterally along the tool bar, a pair of gauge wheels each independently secured to said tool bar laterally outwardly of said longitudinal beams for adjustment laterally along said bar, and adjusting means mounted on each of said beams and slidably connected with said gauge wheels, respectively, for governing the position of said bar and associated tools relative to the ground and accommodating the lateral adjustment of said gauge wheels relative to said tool bar.

3. A lister comprising a pair of laterally spaced generally longitudinally extending beams, a transverse tool bar connected to said beams, a plurality of earth working tools independently connected to said bar and capable of individual adjustment laterally along the tool bar, a pair of gage wheels each independently secured to said tool bar laterally outwardly of said longitudinal beams for adjustment laterally along said bar, a bracket carried by each of said beams adjacent said tool bar, a rock shaft journaled in and extending outwardly of each bracket alongside said tool bar, means slidably connecting each of said rock shafts with the gauge wheel associated therewith, and adjusting mechanism for rocking said shafts.

4. A lister comprising a pair of laterally spaced generally longitudinally extending beams, a transverse tool bar connected to said beams, a plurality of earth working tools independently connected to said bar and capable of individual adjustment laterally along the tool bar, a bracket slidably mounted on said tool bar adjacent each end thereof for lateral adjustment thereon, a crank axle rockably carried by each bracket, a gauge wheel journaled on each crank axle, a pair of rock shafts, each mounted at its inner end on the adjacent longitudinal beam and slidably connected with the bracket at that side of the implement, and means connecting said rock shaft with the associated gauge wheel.

5. A lister comprising a lister frame including a pair of laterally spaced generally longitudinally extending beams, a transverse tool bar connected to said beams, a plurality of earth working tools connected to said bar and capable of individual adjustment laterally along the bar, a pair of brackets slidably and adjustably mounted on said tool bar, a crank axle supported by each of said brackets for swinging in a generally vertical plane, a gauge wheel journaled on each of said crank axles, auxiliary bracket means carried by each of said slidable brackets, a rock shaft at each side of the lister and each including a laterally outer end slidably supported in the associated auxiliary bracket, an arm carried by each of said rock shafts and capable of lateral adjustment with respect thereto, means connecting each of said arms with the associated crank axle, and means connected at the inner ends of said rock shafts for rocking the same to adjust the position of said gauge wheels.

6. The combination with a tractor, of an implement comprising a pair of laterally spaced longitudinally extending beams pivotally connected at their forward ends with the tractor for vertical swinging, a transversely extending tool bar fixedly connected to the rear ends of said beams, said bar being of substantially uniform cross section throughout its length, a plurality of tools including clamping means for clamping said tools to said bar in any one of a variety of lateral positions, a pair of crank axles, a gauge wheel journaled on the cranked portion of each crank axle, a bearing for each crank axle in which the axle portion thereof is journaled and including clamping means for clamping the bearing to said bar in any one of a variety of lateral positions, a bracket fixed on each bearing clamping means, a bracket fixed to the rear end of each beam in transverse alignment with said first bracket, a rock shaft for each crank axle rockably supported in said brackets, means for rocking said shaft, and means connecting said rock shafts with said crank axles whereby the rocking of said shafts adjusts the vertical position of said tools relative to the gauge wheels.

7. The combination with a tractor, of an implement comprising a pair of laterally spaced generally longitudinally extending beams pivotally connected at their forward ends with the tractor for vertical swinging, a transversely extending tool bar fixedly connected to the rear ends of said beams, said bar being of substantially uniform cross section throughout its length, a plurality of tool units including clamping means for clamping said tool units to said bar in any one of a variety of lateral positions, a pair of gauge wheels including clamping means for clamping said gauge wheels to said bar in any one of a variety of lateral positions relative to said bar and the tool units clamped to the latter, and seeding means carried directly on said tool units adjacent said tool bar and operatively connected to be driven by at least one of said gauge wheels in any adjusted position of the latter.

8. The combination with a tractor, of an implement comprising a pair of laterally spaced longitudinally extending beams pivotally connected at their forward ends with the tractor for vertical swinging, a transversely extending tool bar fixedly connected to the rear ends of said beams, a plurality of tools extending generally rearwardly from said transverse tool bar and including clamping means for adjustably fixing the tools to said bar in a number of lateral positions, depth gauging means disposed generally forwardly of and connected with said tool bar and including crank axles pivotally connected to said bar and having gauge wheels journaled thereon, rock shaft means carried by said tool bar forwardly thereof and operatively connected with said crank axles for raising and lowering the tool bar and tools associated therewith, seeding means supported directly on said tools rearwardly of said transverse tool bar and including a drive shaft supported for rotation by means including brackets carried by said tool bar, and means for driving said shaft from at least one of said gauge wheels including a sprocket journaled for rotation on one of said rock shafts.

9. An agricultural implement comprising a pair of laterally spaced generally longitudinally extending beams, a transverse tool bar connected to said beams, a plurality of earth working tools independently connected to said bar and capable of individual adjustment laterally along the tool bar, a pair of gauge wheels each independently secured to said tool bar and also adjustable laterally along said bar, a bracket carried by each of said beams adjacent said tool bar, a rock shaft journaled in and extending laterally from each bracket alongside said tool bar, means adjustably connecting each of said rock shafts with the gauge wheel associated therewith, and adjusting mechanism for rocking said shafts to raise and lower the tool bar relative to the gauge wheels.

10. An agricultural implement comprising a pair of laterally spaced generally longitudinally extending beams, a transverse tool bar connected to said beams, a plurality of earth working tools independently connected to said bar and capable of individual adjustment laterally along the tool bar, a bracket slidably mounted on said tool bar adjacent each end thereof for lateral adjustment thereon, a crank axle rockably carried by each bracket, a gauge wheel journaled on each crank axle, a pair of rock shafts, each mounted at its inner end on the adjacent longitudinal beam and slidably supported in the bracket at that side of the implement, and means slidable along each rock shaft with the associated bracket when the latter is adjusted along said tool bar, for connecting each rock shaft with the associated crank axle to raise and lower the beams relative to the associated gauge wheels.

11. An agricultural implement comprising a frame, a transverse tool bar connected therewith, a bracket slidably mounted on said tool bar adjacent each end thereof for lateral adjustment thereon, a crank axle rockably carried by each bracket, a gauge wheel journaled on each crank axle, a pair of rock shafts mounted at their inner ends on said frame and slidably supported at their outer ends in said brackets, and an arm slidable along each rock shaft with the associated bracket when the latter is adjusted along the tool bar, said arm being link connected with the associated crank axle for raising and lowering the frame relative to the gauge wheels.

12. An agricultural implement comprising a generally longitudinally extending frame member, a transverse bar connected to said frame member, a crank axle adjustably connected with and capable of movement laterally along said bar, a gauge wheel journaled on said crank axle, and means for swinging said crank axle including a part mounted in laterally fixed relation on said frame member and movably connected with said crank axle to accommodate the adjustment of the latter along said bar.

13. An agricultural implement comprising a frame, a transverse bar connected to said frame, a bracket member slidably and adjustably mounted on said bar, a crank axle supported by said bracket member for swinging in a generally vertical plane, a gauge wheel journaled on said crank axle, a rock shaft connected for rocking movement with said frame and including a laterally outer end slidably supported in said bracket member, an arm carried by said rock shaft and capable of lateral adjustment with respect thereto to accommodate adjustment of the bracket member along said bar, means connecting said arm with the crank axle, and means connected with the inner end of said rock shaft for rocking the same to adjust the position of said gauge wheel.

14. The combination with a tractor, of an implement frame connected with the tractor for vertical swinging, a transversely extending bar fixedly connected to said frame, a crank axle, a gauge wheel journaled on the cranked portion of said crank axle, a bearing for the crank axle in which the axle portion thereof is journaled and including clamping means for clamping the bearing to said bar in any one of a variety of lateral positions, a bracket carried by the bearing clamping means, a bracket fixed to the implement frame in transverse alignment with said first bracket, a rock shaft rockably supported in said brackets, means for rocking said shaft, and means connecting said rock shaft with said crank axle whereby the rocking of said shaft adjusts the vertical position of the implement frame relative to the gauge wheel.

15. An agricultural machine comprising a frame, a transversely extending tool bar fixedly connected to said frame, a tool unit including clamping means for clamping said unit to said bar in any one of a number of lateral positions, a gauge wheel, a support for said gauge wheel adapted to be adjustably secured to said bar in any one of a number of lateral positions, seeding means carried on said unit and including a laterally extending seeding shaft, means supporting one end of said shaft in said gauge wheel support, whereby the seeding shaft is shifted relative to said tool unit when said gauge wheel is adjusted, and means carried on said gauge wheel support for driving said shaft from said gauge wheel.

16. An agricultural machine comprising a frame, a transversely extending bar fixedly connected to said frame, supporting means connected with said bar and including a crank axle pivotally connected to said bar for lateral adjustment thereon and a gauge wheel journaled on said crank axle and shiftable with the latter relative to said bar, rock shaft means carried by said bar and held against lateral movement relative thereto, and means shiftably connecting said rock shaft means with said crank axle for raising and lowering the frame in different adjusted positions of said crank axle relative to said transverse bar.

17. An agricultural machine comprising a frame, a transversely extending tool bar fixedly connected to said frame, a tool unit including means adjustably fixing the unit to said bar in laterally adjusted position, depth gauging means connected with said tool bar and including a crank axle pivotally connected to the bar for lateral adjustment thereon and a gauge wheel journaled on said crank axle and shiftable with the latter relative to the tool bar, a rock shaft carried by said tool bar and operatively connected with said crank axle for raising and lowering the frame, seeding means supported directly on said tool unit, and means including a part rotatably mounted on said rock shaft for driving said seeding means from said gauge wheels.

18. An agricultural machine comprising a frame, a transversely extending bar fixedly connected to said frame and extending outwardly therefrom, supporting means connected with said bar and including a bracket slidably mounted on the latter, a crank axle connected for rocking movement with said bracket and a wheel journaled for rotation on said crank axle and shiftable with the latter and said bracket relative to said bar, a rock shaft journaled at its inner end for rocking movement on said frame and extending laterally outwardly alongside said tool bar and slidably supported in said bracket, means slidable with the latter and serving to connect said rock shaft with said crank axle for swinging the latter, and means connected with the inner end of said rock shaft for swinging said crank axle.

19. An agricultural machine comprising a frame, a transversely extending bar fixedly connected to said frame and extending outwardly therefrom, supporting means connected with said bar and including a bracket slidably mounted on the latter, a crank axle connected for rocking movement with said bracket and a wheel journaled for rotation on said crank axle and shiftable with the latter and said bracket relative to said bar, a seeding unit supported by said frame and including a laterally shiftable seeding shaft, a rock shaft journaled at its inner end for rocking movement on said frame but held against lateral displacement relative thereto and slidably supported in said bracket, means slidable with the latter and serving to connect said rock shaft with said crank axle for swinging the latter, and means connected with the inner end of said rock shaft for swinging said crank axle.

20. An agricultural implement comprising a generally longitudinally extending frame member, a transverse bar connected to said frame member, a crank axle adjustably connected with and capable of movement laterally along said bar, a gauge wheel journaled on said crank axle, and means for swinging said crank axle including a laterally extending rock shaft mounted at one end against lateral movement relative to the frame member and slidably connected at its other end with said crank axle so as to accommodate adjustment of the latter along the transverse bar.

21. A lister attachment for a tractor having laterally spaced rear wheels, said attachment comprising a frame including a pair of laterally spaced generally longitudinally extending beams adapted to be disposed between the tractor wheels and to be connected to the tractor for vertical movement, and a transverse tool bar connected to said beams, at least one earth working tool connected to said bar and capable of adjustment laterally along the tool bar, a pair of gauge wheels each independently secured to said tool bar laterally outwardly of said longitudinal beams for adjustment laterally along said bar, said gauge wheels being adjustable vertically relative to said bar, a bearing member mounted on the frame adjacent each of said beams, a rock shaft having its inner end journaled in and extending outwardly of each bearing member along said tool bar, means slidably connecting each of said rock shafts with the gauge wheel associated therewith, and adjusting mechanism adjacent each of said bearing members for rocking said shafts.

22. An implement attachment for a tractor having laterally spaced rear wheels, said attachment comprising a frame including a pair of spaced longitudinally extending beams adapted to be disposed between the tractor wheels and to be connected to the tractor for vertical movement, a transverse tool bar connected to said beams, at least one earth working tool connected to said bar and capable of adjustment laterally along the tool bar, a bracket on said tool bar adjacent each end thereof, gauge wheel supporting means connected with each bracket for vertical movement with respect thereto, a gauge wheel on each of said supporting means, a bearing member mounted on the frame adjacent each of said beams, a rock shaft having its inner end journaled in and extending outwardly of each bearing member alongside the tool bar and journaled at its outer end on the adjacent bracket, an arm disposed on the outer end of each rock shaft, means connecting each of said arms with the adjacent wheel supporting means, and adjusting mechanism adjacent the inner end of each of said rock shafts for rocking the latter to adjust the position of the gauge wheels vertically relative to said frame.

23. An implement attachment for a tractor having laterally spaced rear wheels, said attachment comprising a frame including a pair of spaced longitudinally extending beams adapted to be disposed between the tractor wheels and to be connected to the tractor for vertical movement, a transverse tool bar connected to said beams, at least one earth working tool connected to said bar and capable of adjustment laterally along the tool bar, gauge wheel supporting means connected to said transverse bar adjacent each end thereof, respectively, for vertical movement relative thereto, a gauge wheel on each of said supporting means, a bearing member mounted on the frame adjacent each of said beams, a rock shaft having its inner end journaled in and extending outwardly of each bearing member alongside the tool bar, an arm disposed on the outer end of each rock shaft, means connecting each of said arms with the adjacent wheel supporting means, and adjusting mechanism adjacent the inner end of each of said rock shafts for rocking the latter to adjust the position of the gauge wheels vertically relative to said frame.

24. An implement attachment for a tractor having laterally spaced rear wheels, said attachment comprising a frame including a pair of spaced longitudinally extending beams adapted to be disposed between the tractor wheels and to be connected to the tractor for vertical movement, a transverse tool bar connected to said beams, at least one earth working tool connected to said bar and capable of adjustment laterally along the tool bar, and a pair of laterally spaced depth adjusting devices, each of said devices comprising a bracket mounted on said tool bar, a bearing member on said frame, spaced laterally with respect to said bracket, a rock shaft journaled on said bracket and in said bearing member, a gauge wheel supporting means connected to said bracket for vertical movement relative thereto, a gauge wheel journaled on said supporting means, an arm fixed to said rock shaft, means connecting said arm with said wheel supporting means, and means for rocking said rock shaft to adjust the position of said gauge wheel relative to said frame.

25. An agricultural implement comprising a frame including a transversely disposed tool bar of square cross section, a pair of laterally spaced, longitudinally extending draft beams fixed to said bar, at least one earth working tool unit having means for adjustably connecting the same to said tool bar in any one of a number of lateral positions, said connecting means comprising companionate notched clamping members adapted to embrace said bar, and a pair of laterally spaced depth adjusting devices, each of said devices comprising a bracket member including notched clamping means embracing said bar for holding said bracket member non-rotatably thereon, a bearing member on said frame and spaced laterally with respect to said bracket, a rock shaft journaled on said bracket and bearing members, a gauge wheel support carried on said bracket member for vertical movement relative to said frame, a gauge wheel journaled on said support, an arm fixed to said rock shaft and connected to said gauge wheel support, and means for rocking said rock shaft to adjust the position of said gauge wheel relative to said frame.

26. A lister comprising a frame having a pair of laterally spaced generally longitudinally extending beams and a transverse tool bar connected to said beams, at least one earth working tool connected to said bar and capable of adjustment laterally along the tool bar, a bracket slidably mounted on said tool bar adjacent each end thereof for lateral adjustment thereon, a gauge wheel support connected with each bracket for vertical movement with respect thereto, a gauge wheel journaled on each support, a rock shaft mounted on said frame at each side thereof and slidably connected with the bracket at that side of the frame, and means connecting each rock shaft with the associated gauge wheel support.

27. A lister comprising a lister frame including a pair of laterally spaced generally longitudinally extending beams, a transverse tool bar connected to said beams, earth working tool means connected to said bar and capable of adjustment laterally along the bar, a pair of brackets slidably and adjustably mounted on said tool bar, a gauge wheel support connected with each of said brackets for vertical movement, a gauge wheel journaled on each of said wheel supports, auxiliary bracket means carried by each of said slidable brackets, a rock shaft at each side of the lister and each including a laterally outer end slidably supported in the associated auxiliary bracket, an arm carried by each of said rock shafts and capable of lateral adjustment with respect thereto, means connecting each of said arms with the associated wheel support, and means connected at the inner ends of said rock shafts for rocking the same to adjust the position of said gauge wheels.

28. An agricultural implement comprising a frame, a transverse tool bar connected therewith, a bracket slidably mounted on said tool bar adjacent each end thereof for lateral adjustment thereon, a gauge wheel axle connected to each bracket for vertical movement relative thereto, a gauge wheel journaled on each axle, a pair of rock shafts mounted at their inner ends on said frame and slidably supported at their outer ends in said brackets, and an arm slidable along each rock shaft with the associated bracket when the latter is adjusted along the tool bar, said arm being link connected with the associated gauge wheel axle for raising and lowering the frame relative to the gauge wheels.

29. A lister comprising a generally longitudinally extending beam, a transverse tool bar connected to said beam, earth working tool means connected to said bar and capable of adjustment laterally along the tool bar, a gauge wheel, means securing said gauge wheel to said tool bar providing vertical movement of the wheel relative to the tool bar and shiftable laterally along said bar, a rockshaft supported for rotation relative to said tool bar, adjusting means mounted adjacent said longitudinally extending beam and fixed against lateral movement relative thereto and including a lever arm on the inner end of said rockshaft for rocking said rockshaft, and an actuating arm on the outer end of said rockshaft and connected with said gauge wheel for adjusting the latter vertically responsive to rocking of said rockshaft, at least one of said arms being shiftable laterally relative to said rockshaft to accommodate movement relative thereto when said gauge wheel is shifted along the tool bar.

30. A lister comprising a generally longitudinally extending beam, a transverse tool bar connected to said beam, earth working tool means connected to said bar and capable of adjustment laterally along the tool bar, a bracket at the outer end of said tool bar and shiftable laterally along the latter, gauge wheel supporting means swingably connected with said bracket for vertical adjustment relative thereto, a gauge wheel journaled on said supporting means, a rockshaft having its outer end journaled in said bracket and journaled near its inner end adjacent said longitudinally extending beam, a pair of lever arms on said rockshaft, one of said lever arms being connected with said gauge wheel supporting means for swinging the latter to adjust said gauge wheel vertically, and manually controlled mechanism associated with the other of said lever arms for rocking said rock shaft and for securing the latter in adjusted position, at least one of said arms being shiftable laterally relative to said rockshaft to accommodate movement relative thereto when said gauge wheel is shifted along the tool bar.

31. A lister comprising a generally longitudinally extending beam, a transverse tool bar connected to said beam, earth working tool means connected to said bar and capable of adjustment laterally along the tool bar, a bracket at the outer end of said tool bar and shiftable laterally along the latter, said bracket comprising a pair of cooperative portions having complementary clamping recesses to receive said tool bar and means for securing the same in clamped relation on said bar, gauge wheel supporting means swingably connected to one of said bracket portions for vertical adjustment relative thereto, a gauge wheel journaled on said supporting means, a rockshaft having its outer end supported on one of said bracket portions, a pair of lever arms on said rockshaft, one of said lever arms being connected with said gauge wheel supporting means for swinging the latter to adjust said gauge wheel vertically, and manually controlled mechanism associated with the other of said lever arms for rocking said rock shaft and for securing the latter in adjusted position, at least one of said arms being shiftable laterally relative to said rockshaft to accommodate movement relative thereto when said gauge wheel is shifted along the tool bar.

32. A tractor mounted implement comprising a pair of laterally spaced beams extending longitudinally under the tractor body, means pivotally connecting the forward ends of said beams with the tractor forward of the rear axle thereof, providing some vertical swinging movement relative thereto and capable of some lateral swinging movement relative thereto, a transversely extending tool bar disposed behind the tractor and fixed to the rear ends of said beams, a bracing member disposed ahead of said tool bar and fixed at opposite ends thereof to said longitudinally extending beams, respectively, a generally vertical plate fixed to said bracing member between said beams and having an aperture therein, and a Y-shaped member having laterally spaced arm sections pivoted on the tractor body for vertical swinging movement relative thereto and extending rearwardly therefrom and having a central section adapted to extend through said aperture in the plate, serving to restrain the implement from lateral swinging movement relative to the tractor, the vertical dimension of said aperture being slightly larger than said central section of the Y-shaped member to accommodate vertical movement of the implement.

33. A tractor mounted implement comprising a pair of laterally spaced beams extending longitudinally under the tractor body, means pivotally connecting the forward ends of said beams with the tractor forward of the rear axle thereof, providing some vertical swinging movement relative thereto and capable of some lateral swinging movement relative thereto, a transversely extending tool bar disposed behind the tractor and connected with said beams, a bracing member disposed ahead of said tool bar and fixed at opposite ends thereof to said longitudinally extending beams, respectively, a plate fixed to said bracing member between said beams and extending generally vertically therefrom and having an aperture therein, a vertically swingable member pivotally connected to the tractor on a transverse axis spaced from said pivot connection of said beams and having a rearwardly extending arm slidable through said aperture in the plate as the implement swings vertically relative to the tractor, accommodating vertical swinging movement of the implement but serving to restrain the latter from lateral swinging movement relative to the tractor.

34. A tractor mounted implement comprising a pair of laterally spaced beams extending longitudinally under the tractor body, means pivotally connecting the forward ends of said beams with the tractor forward of the rear axle thereof, providing some vertical swinging movement relative thereto and capable of some lateral swinging movement relative thereto, a transversely extending tool bar, bracing means disposed ahead of said tool bar and connected between said beams, said bracing means including a flat member disposed in a substantially transverse vertical plane and having an aperture therein, a vertically swingable member pivotally connected to the tractor on a transverse axis spaced from said pivot connection of said beams and having a rearwardly extending arm slidable through said aperture in the member as the implement swings vertically relative to the tractor, accommodating vertical swinging movement of the implement but serving to restrain the latter from lateral swinging movement relative to the tractor.

35. A tractor mounted implement comprising a pair of laterally spaced beams extending generally longitudinally, means pivotally connecting the forward ends of said beams with the tractor, providing some vertical swinging movement relative thereto about a transverse axis and capable of some lateral swinging movement relative thereto, a bracing member fixed at opposite ends thereof to said longitudinally extending beams, respectively, an apertured part on said bracing member between said beams, a vertically swingable member pivoted to the tractor on a transverse axis spaced from the axis of the pivot connections of said beams, the aperture in said part facing generally toward said axes, and an arm carried on said swingable member and extending in a direction generally longitudinally of the tractor, said arm being slidable generally in that direction through said aperture as the implement swings vertically relative to the tractor, and serving to restrain the implement from lateral swinging movement relative to the tractor, said aperture being slightly larger than said arm to accommodate movement of the latter therein due to raising and lowering movements of the implement.

WALTER H. SILVER.